(12) United States Patent
Chandramouli et al.

(10) Patent No.: US 8,478,743 B2
(45) Date of Patent: Jul. 2, 2013

(54) ASYNCHRONOUS TRANSFER OF STATE INFORMATION BETWEEN CONTINUOUS QUERY PLANS

(75) Inventors: Badrish Chandramouli, Bellevue, WA (US); Jonathan David Goldstein, Kirkland, WA (US); Peter Alfred Zabback, Kirkland, WA (US); David Eugene Maier, Portland, OR (US); Di Wang, Worcester, MA (US)

(73) Assignee: Microsoft Corporation, Redmond, WA (US)

( * ) Notice: Subject to any disclaimer, the term of this patent is extended or adjusted under 35 U.S.C. 154(b) by 123 days.

(21) Appl. No.: 12/977,107

(22) Filed: Dec. 23, 2010

(65) Prior Publication Data
US 2012/0166417 A1 Jun. 28, 2012

(51) Int. Cl.
G06F 7/00 (2006.01)
G06F 17/30 (2006.01)

(52) U.S. Cl.
USPC .......................................................... 707/718

(58) Field of Classification Search
USPC .......................................................... 707/718
See application file for complete search history.

(56) References Cited

U.S. PATENT DOCUMENTS

| | | | |
|---|---|---|---|
| 7,536,396 B2 | 5/2009 | Johnson et al. | |
| 2009/0100029 A1 | 4/2009 | Jain et al. | |
| 2009/0106189 A1* | 4/2009 | Jain et al. | 707/2 |
| 2009/0106214 A1 | 4/2009 | Jain et al. | |

OTHER PUBLICATIONS

Heinz, et al., "Toward Simulation-Based Optimization in Data Stream Management Systems", Retrieved at << http://ieeexplore.ieee.org/stamp/stamp.jsp?tp=&arnumber=4497626 >>, Apr. 2008, pp. 1-4.

Yang, et al., "HybMig: A Hybrid Approach to Dynamic Plan Migration for Continuous Queries", Retrieved at << http://www.cs.ust.hk/~dimitris/PAPERS/TKDE07-HybMig.pdf >>, Mar. 2007, pp. 1-14.

Raizman, et al., "An Extensible Test Framework for the Microsoft StreamInsight Query Processor", Retrieved at << http://research.microsoft.com/pubs/132100/Testing%20StreamInsight.pdf >>,, Jun. 7, 2010, pp. 1-6.

Rundensteiner, et al., "CAPE: Continuous Query Engine with Heterogeneous-Grained Adaptivity", Retrieved at << http://citeseerx.ist.psu.edu/viewdoc/download?doi=10.1.1.2.2561&rep=rep1&type=pdf >>, 2004, pp. 1-4.

Ng, et al., "On Reconfiguring Query Execution Plans in Distributed Object-Relational DBMS", Retrieved at << http://ieeexplore.ieee.org/stamp/stamp.jsp?tp=&arnumber=741020 >>, Aug. 6, 2002, pp. 1-8.

Zhu, et al., "Dynamic Plan Migration for Continuous Queries Over Data Streams", Retrieved at << http://citeseerx.ist.psu.edu/viewdoc/download?doi=10.1.1.106.5193&rep=rep1&type=pdf >>, 2004, pp. 1-12.

(Continued)

Primary Examiner — James Trujillo
Assistant Examiner — Jeffrey Chang

(57) ABSTRACT

Described herein are technologies pertaining to migrating state information of operators in a first continuous query plan to a second continuous query plan in an asynchronous manner, such that the first continuous query plan need not cease executing during the migrating of the state information. State information pertaining to stateful operators, such as join operators, is migrated from the first continuous query plan to the second continuous query plan by way of a transformation plan. State matching is utilized to generate the transformation plan.

20 Claims, 10 Drawing Sheets

OTHER PUBLICATIONS

J. Kramer, Y. Yang, et al. "Dynamic Plan Migration for Snapshot-Equivalent Continuous Queries in Data Stream Systems", Retrieved at <<http://dbs.mathematik.uni-marburg.de/publications/myPapers/2006/KYC+06.pdf>>, EDBT Workshop. 2007, pp. 1-20.

B. Chandramouli, J. Goldstein, and D. Maier. "High-Performance Dynamic Pattern Matching over Disordered Streams", Retrieved at <<http://research.microsoft.com/pubs/137082/AFA-paper.pdf>>, VLDB 2010, pp. 1-12.

Babu, S., Munagala, K., Widom, J., Motwani, R. "Adaptive Caching for Continuous Queries", Retrieved at <<http://ilpubs.stanford.edu:8090/636/1/2004-14.pdf>>, ICDE 2005. pp. 1-22.

S. Madden, M. Shah, J. M. Hellerstein, and V. Raman. "Continuously adaptive continuous queries over streams", Retrieved at <<http://db.cs.berkeley.edu/papers/sigmod02-cacq.pdf>>, SIGMOD 2006. pp. 1-12.

Babu, S., Bizarro, P., DeWitt, D.: "Proactive Re-Optimization", Retrieved at <<http://ilpubs.stanford.edu:8090/709/1/2005-6.pdf>>, In: Proc. of the ACM SIGMOD. 2005. pp. 107-118.

S. D. Viglas, J. F. Naughton and J. Burger. "Maximizing the output rate of multi-way join queries over streaming information sources", Retrieved at <<http://www.vldb.org/conf/2003/papers/S10P01.pdf>>, VLDB 2003. pp. 285-296.

* cited by examiner

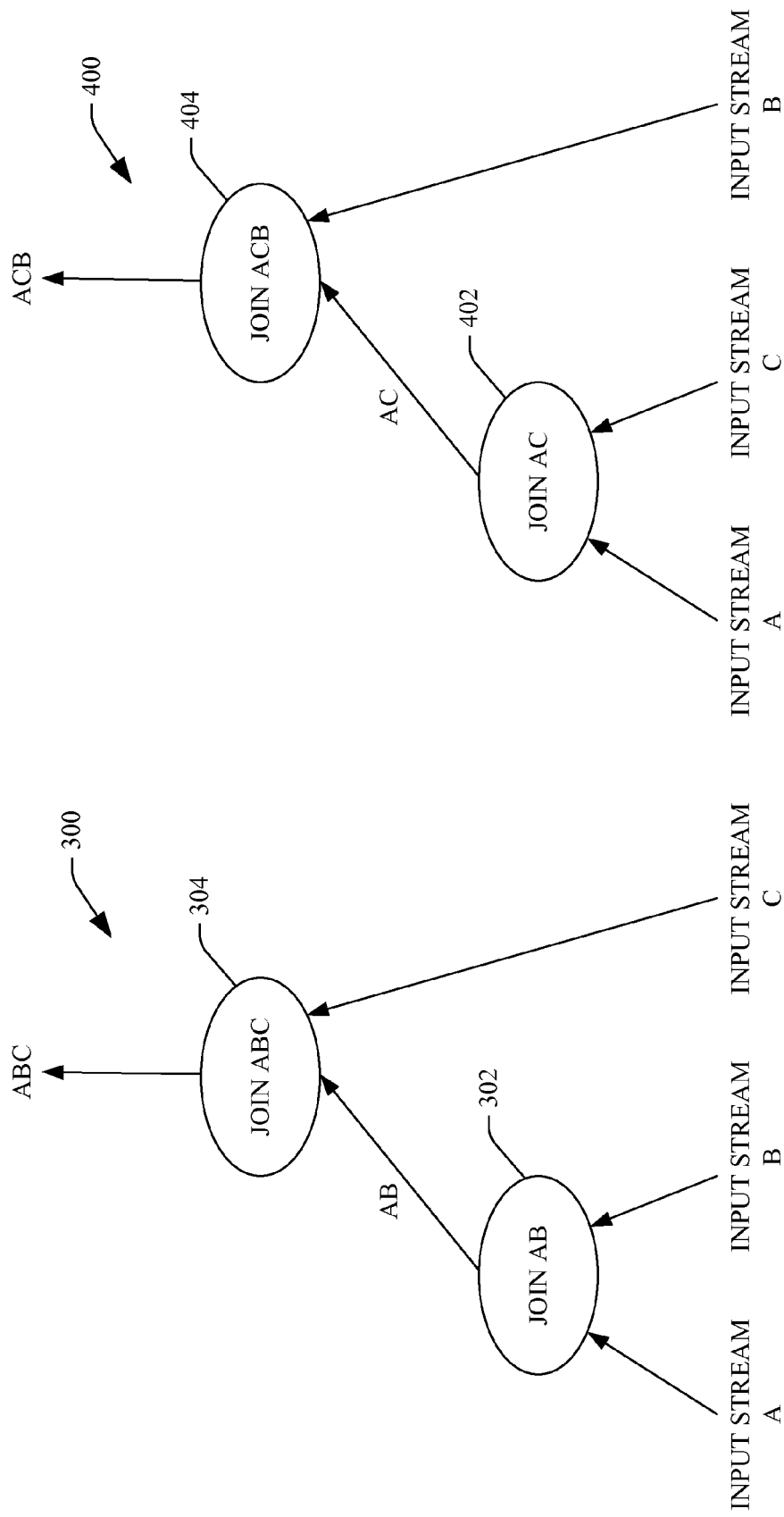

ASYNCHRONOUS TRANSFER OF STATE INFORMATION BETWEEN CONTINUOUS QUERY PLANS

BACKGROUND

A data stream management system (DSMS) is a computing platform that processes continuous streams of events at relatively high data rates. These events, for instance, can be events received from sensors, events retained in a file, etc. Moreover, each event processed by a DSMS includes a payload and a time window corresponding thereto, wherein the time window indicates a window of time that the event is contributing to an output. A DSMS can receive multiple data streams, wherein each of the data streams includes various events, and the DSMS and can perform various processes on events in such streams to produce an output stream of events.

An event is a data object that is temporal in nature. Specifically, an event can include data indicative of a start time and an end time, wherein the window between the start time and the end time is when the event actively contributes to output. The start time and end time can be represented in an event by two timestamps, $V_s$ and $V_e$. A data stream is a sequence of these events. In real-world applications, due to transmission delays or other factors, events can be generated and/or received out of order. A punctuation or current time increment (CTI) is a special event that is employed to limit an amount of disorder that can occur in a data stream. With more particularity, a CTI can guarantee that no subsequently received event in the data stream will have a start time prior to a time indicated by a CTI.

As indicated above, $V_s$ and $V_e$ can represent a start time and an end time for an event, such that the event is active for the time interval between $V_s$ and $V_e$. A CTI is associated with an application time t, wherein the CTI is essentially a guarantee that no future event will have a $V_s$ that is less than t. Moreover, events can be of different types. For instance, an insert event can be a new event from the outside world while a lifetime modification event (also referred to as a revision or a retraction or an expansion) is an event that signals a modification of the lifetime of an earlier event. A retraction sets the new end time $V_{newe}$ to a time earlier than $V_e$, while an expansion sets $V_{newe}$ to a time later than $V_e$. Thus, a physical stream can include an original event with a $V_s$ and $V_e$ along with a modification that changes $V_e$ to $V_{newe}$, which signals that the end time of the event has been changed. The special case of $V_{newe}=V_s$ signals a full retraction or deletion of the corresponding event. In general, a physical stream consists of inserts of new events as well as lifetime modifications of prior events, plus CTIs.

To process events provided to a DSMS, applications generally issue long running queries (referred to herein as continuous queries) that are registered with the DSMS. The DSMS accepts input data streams, and the query is executed over such input data streams. Processing of the input data streams results in production of an output data stream that denotes the result of the execution of the continuous query over the input data streams.

Generally, continuous queries are expressed declaratively and are typically compiled by the DSMS into a continuous query plan for execution. A continuous query plan can be represented as a directed acyclic graph, wherein nodes of the graph are operators, and wherein the operators are connected by event streams (which can also be referred to as event queues). During execution of the continuous query, incoming events are pushed through this directed acyclic graph of operators, and the final output stream is produced by way of such a particular continuous query plan. As events continue to arrive in the input streams, the continuous query plan continues to produce events in the output steam.

It is to be understood that oftentimes, a single continuous query can be represented by multiple different continuous query plans, wherein each of the continuous query plans can be logically equivalent. For instance, a continuous query can be declared that is configured to retrieve a temporal join of three input streams: A, B, and C. A first continuous query plan that represents such query may be $((A \bowtie B) \bowtie C)$, while a second continuous query plan that represents the query may be $((A \bowtie C) \bowtie B)$, while a third continuous query plan that represents the query may be $((B \bowtie C) \bowtie (A)$. In some instance, it may be desirable to migrate from a first continuous query plan to a second continuous query plan. This migration might be desirable, for instance, if the second continuous query plan will execute faster than the first continuous query plan, if high availability is desired with respect to the continuous query, etc.

Conventional techniques for migrating between continuous query plans, however, are relatively inefficient. For example, a first technique for migrating between query plans is to altogether stop the currently executing query plan (the old query plan) and transfer all state information and event queues from the old query plan to a new query plan. This is inefficient for a variety of reasons. First, the old query plan and the new query plan must be structurally equivalent query plans. Additionally, the old query plan must be stopped while all of the state information and event queues are copied from the old query plan to the new query plan. This copying can take a significant amount of time, and for queries that require high availability, this technique is an unacceptable solution.

Another technique for migrating from the old query plan to the new query plan involves continuing to execute the old query plan while providing the same input streams to the new query plan and executing both the old and new query plans until the result streams output by the query plans are identical. As indicated above, however, events processed by these query plans can have time windows corresponding thereto, these time windows can be relatively long. Thus, the new query plan will not output correct data until a relatively long time window has expired, which may be unacceptable in many situations. Furthermore, because of differences in the order and type of events between the two query plans, their respective outputs might never become completely identical.

SUMMARY

The following is a brief summary of subject matter that is described in greater detail herein. This summary is not intended to be limiting as to the scope of the claims.

Described herein are various technologies pertaining to migrating a first continuous query plan (old query plan) executing in a DSMS to a second continuous query plan (new query plan) executing in the DSMS, wherein the old query plan and the new query plan are logically equivalent. Additionally, utilizing the technology described herein, the old query plan can be migrated to the new query plan without halting execution of the old query plan, even when the old query plan and the new query plan are logically equivalent but structurally different. This migration can be accomplished, for instance, by asynchronously migrating state information corresponding to operators in the old query plan to the new query plan. This state information can be mapped from the old query plan to the new query plan by a transformation plan, which is described herein. Moreover, an old query plan can be migrated to the new query plan when such query plans are both logically and structurally equivalent, and such migration can occur without halting execution of the old query plan.

A continuous query plan can be (or be represented by) a directed acyclic graph, wherein operators are nodes and are connected by event streams (also referred to as event queues). Further, events processed by such operators can have a payload and temporal data associated therewith, wherein the temporal data can indicate a time window in which the event is actively contributing to an output stream. For example, an event can include a start timestamp and an end timestamp, wherein time between the start timestamp and the end timestamp is the time window.

A continuous query plan can include a plurality of different types of operators that perform some form of operation on events. Some of these operators retain state information when processing data. That is, the operator must retain information about an event due to the length of time that the event can be utilized in producing output. For instance, a join operator can be utilized to join events from two different data streams if the events temporally overlap and some defined predicate involving the payload values is met. Since events can be active for a relatively long amount of time, this type of operator must retain the event to ensure that a join is properly conducted with an event from another data stream.

When migrating state information between an old query plan and a new query plan, migration can be undertaken asynchronously at the operator level in the old query plan. Migration can be initiated by injecting a special event type into the old query plan. When an operator receives this event type, migration of state information, if any, can be transmitted to the new query plan by way of a transformation plan. Various exemplary mechanisms for preparing the old query plan and the new query plan for migration will be described herein, and additionally various exemplary mechanisms for transferring state information from the old query plan to the new query plan will be described in greater detail herein.

Other aspects will be appreciated upon reading and understanding the attached figures and description.

BRIEF DESCRIPTION OF THE DRAWINGS

FIG. 3 is an exemplary continuous query plan.

FIG. 4 is an exemplary continuous query plan that is logically equivalent but structurally different from the continuous query plan shown in FIG. 3.

DETAILED DESCRIPTION

Figure 1:
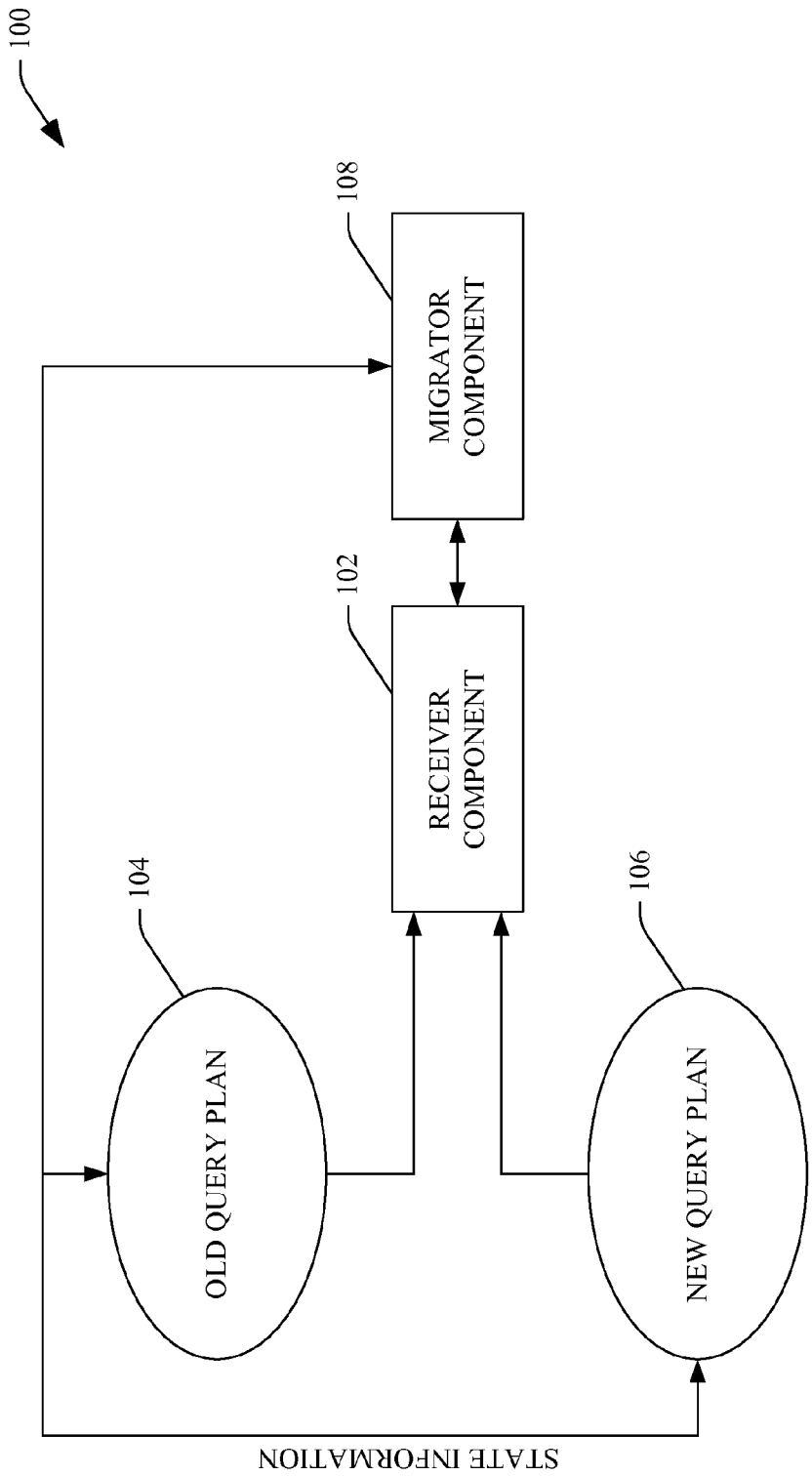
FIG. 1 is a functional block diagram of an exemplary system that facilitates migrating a first continuous query plan to a second continuous query plan.

Various technologies pertaining to migrating a first continuous query plan (an old query plan) to a second continuous query plan (a new query plan), wherein the old query plan and the new query plan are logically equivalent query plans, will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

With reference to FIG. 1, an exemplary system 100 that facilitates migrating a first continuous query plan (an old query plan) to a second continuous query plan (a new query plan), wherein the old query plan and the new query plan are logically equivalent, is illustrated. The system 100 comprises a receiver component 102 that receives an old query plan 104 and a new query plan 106, wherein the new query plan 106 may be received at an arbitrary time in the future from when the old query plan 104 was received. The system 100 may be comprised by a data stream management system (DSMS) that is configured to execute continuous queries over one or more input streams of data, wherein the input streams of data comprise a plurality of events. Each event in the input stream can have a payload associated therewith as well as temporal information. This temporal information can include a first timestamp (e.g., when the data was captured or when the payload is desirable to become active) and a second timestamp (when the payload is no longer desired to be active). A time between the first timestamp and the second timestamp can be referred to as a window, wherein the window is the time where the event actively contributes to output. The old query plan 104 can be active and configured to receive at least one input data stream that comprises a plurality of events, and the old query plan 104 can be configured to produce output results based upon processing undertaken by operators in the old query plan 104.

Pursuant to an example, it may be desirable to migrate from the old query plan 104 to the new query plan 106. Migration, as used herein, refers to migrating state information corresponding to operators in the old query plan 104 to the new query plan 106 such that the new query plan 106 will, as quickly as possible, begin producing correct output with respect to at least one input stream of data. This migration might be desirable in a variety of circumstances. For instance, a query optimizer can ascertain that a logically equivalent but structurally different query plan will execute more efficiently than a currently executing continuous query plan. Therefore, in this case, it is desirable to form the new query plan and get the new query plan up and running as quickly as possible to obtain the more efficient processing of an input data stream to obtain identical output, and to be able to discontinue processing of the old query plan. In another example, it may be desirable, for a particular continuous query, to ensure high availability such that if for some reason a first continuous query plan is no longer able to execute, then a second continuous query plan can continue to generate correct outputs. This can occur, for instance, in systems where data is processed in real-time to ensure safety or wellbeing of one or more individuals.

As mentioned previously, the old query plan 104 can comprise a directed acyclic graph of operators. In such a directed acyclic graph, the nodes of such graph are the operators and the edges are data streams or event queues. Thus, the old query plan 104 can comprise a plurality of operators, wherein at least one of such operators is a stateful operator. In other words, the operator maintains a particular state corresponding thereto, wherein the state information can relate to a plurality of events that are copied/retained by the operator to ensure correct output from such operator. Exemplary operators that can be included in either the old query plan 104 or the new query plan 106 comprise a select operator, a project operator, a join operator, an aggregation operator, a multicast operator and/or a union operator. Other operators that can be employed in DSMS are contemplated and are intended to fall under the scope of the hereto appended claims.

A select operator is a stateless operator that applies a predicate to each event payload. If the predicate is satisfied, the event is written to the output stream of the operator. A project operator performs some stateless modification to the payload of each event. A join operator joins events from different input streams so long as the events temporally align (the windows of the events overlap) and optionally a predicate is met. Thus, the join operator is a stateful operator in that events are retained over their respective time window to ensure that the joint operator generates correct output. Therefore, for instance, a join operator can maintain a plurality of different data structures that represent a state corresponding to the join operator, wherein the number of data structures equals the number of input data streams received by the join operator. An aggregate operator is another sort of stateful operator that applies an aggregate function, such as minimum, count or average to groups of events that are simultaneous active, that is, whose temporal windows overlap. Another exemplary operator that can be included in a query plan is a multicast operator, which receives a single input stream and copies such input stream to two or more output streams. A union operator acts in the inverse fashion in that it receives two or more input streams with identical schema and merges such input streams into a single output stream.

As mentioned above, the new query plan 106 can also include a plurality of operators and can be in the form of a directed acyclic graph. In a first example, the structure of the directed acyclic graph of the old query plan 104 may be different than the structure of the new query plan 106. However, the directed acyclic graphs are logically equivalent in that both the old query plan 104 and the new query plan 106 will generate identical outputs (when both the old query plan 104 and the new query plan 106 are operating properly). In a second example, the old query plan 104 and the new query plan 106 may be both structurally and logically equivalent.

A migrator component 108 is in communication with the receiver component 102 and automatically and asynchronously migrates state information corresponding to at least one stateful operator in the old query plan 104 to the new query plan 106. The migrator component 108 migrates the state information in such a manner that the old query plan query 104 need not cease executing during migration of the state information. As will be described below, migration can be initiated at an operator by providing such operator with an event of a particular type. Receipt of this event can cause the operator migrate state information to the new query plan 106 by way of a transformation plan. Generation of the transformation plan and mapping of the old query plan 104 to the new query plan 106 will be described in greater detail below. The end result of migration is that the new query plan 106 is executing over the input streams of data relatively quickly without causing the old query plan 104 to cease producing an output data stream.

Additionally, it is to be understood that the migrator component 108 can cause migration from the old query plan 104 to the new query plan 106 by way of one or more intermediate steps. For instance, state information from the old query plan 104 can be written to disk as a checkpoint, and during recovery or restart can be read from disk as a "restore" of the checkpoint into the new query plan 106.

Figure 2:
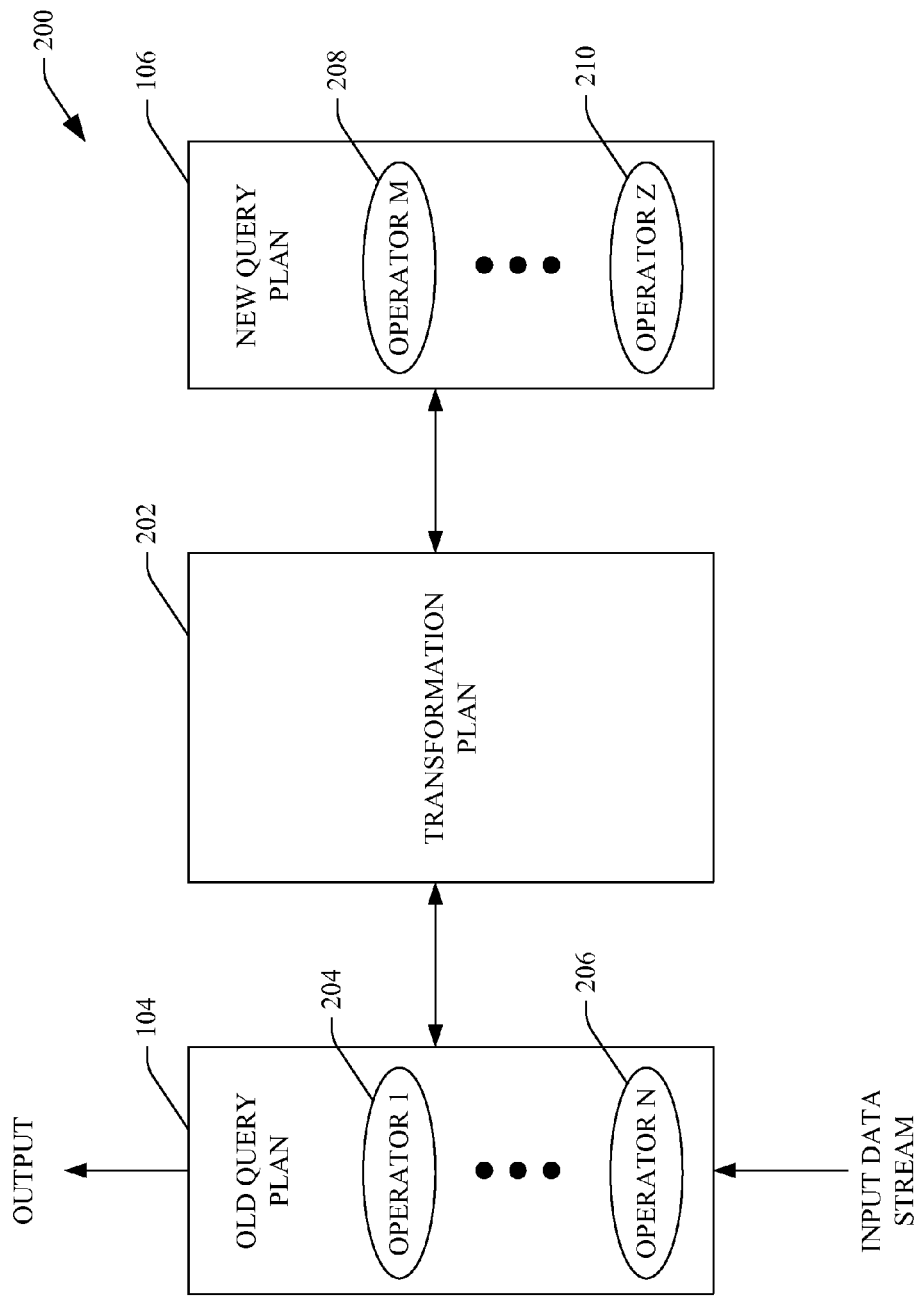
FIG. 2 is a functional block diagram of an exemplary migration of a first continuous query plan to a second continuous query plan by way of a transformation plan.

With reference now to FIG. 2, an exemplary mapping 200 of the old query plan 104 and the new query plan 106 by way of a transformation plan is illustrated. As mentioned previously, the old query plan 104 can comprise a plurality of operators 204-206, wherein such operators are nodes in a directed acyclic graph that are connected by event streams or queues. The old query plan 104 receives at least one input data stream, and the plurality of operators 204-206 act to perform various operations on events in the input data stream to generate output events. A query optimizer, for instance, can ascertain that a structure of the old query plan 104 is no longer optimal due to, for instance, change in characteristics of the operating environment of an operator (e.g., available CPU, memory, etc.), change in workloads with respect to computing systems utilized to execute portions of the old query plan 104, the distribution of values in one or more input data streams changes, etc. and can further ascertain that the new query plan 106 will execute more efficiently in the current computing environment. Also, in another example, additional availability may be desired such that a copy of the old query plan 104 is desirably generated and executed as the new query plan 106 in parallel with the old query plan 104. Accordingly, the new query plan 106 can also comprise a plurality of operators 208-210 that are in the form of a directed acyclic graph.

The transformation plan 202 can be generated based at least in part upon structure of the directed acyclic graph in the old query plan 104 compared to structure of the directed acyclic graph in the new query plan 106. The transformation plan 202 can connect the old query plan 104 with the new query plan 106 by way of state transfer operators and by way of one or more data streams between the old query plan 104 and the new query plan 106. Once the state information from stateful operators in the old query plan 104 has been migrated to the new query plan 106, the new query plan 106 can receive the at least one input data stream and generate correct output events.

A migration of state information from the old query plan 104 to the new query plan 106 will first be described by way of a relatively high-level protocol. Additional detail pertaining to state migration will be provided below. First, a user can submit a declarative continuous query. Thereafter, a query optimizer can determine an optimal query plan for the submitted query, and such optimal plan can be instantiated. In this example, the optimal plan may be the old query plan 104.

Thereafter, a determination can be made that it is desirable to begin executing the new query plan 106, and thus it is desirable to migrate state information pertaining to stateful operators in the old query plan 104 to the new query plan 106. There are various scenarios where it is desirable to begin executing the new query plan 106. For instance, the query optimizer can determine, based on statistics or other information, of the existence of a continuous query plan (the new query plan 106) that is better than the old query plan 104. In another example, the user may manually determine that a change from the old query plan 104 to a different plan (the new query plan 106) is warranted and submit the new query plan 106 to the DSMS. In still yet another example, the DSMS may desire to transport the execution of the query to a different set of computing devices with potentially different resources and configurations. In this example, the new query plan 106 may be structurally identical or structurally different from the old query plan 104. In still yet another example, the DSMS may desire to create a duplicate copy of the old query plan 104 for high availability—and thus the new query plan 106 can be a logical and structural equivalent of the old query plan 104.

Thereafter, the new query plan 106 can be instantiated as an empty plan, and the transformation plan 202 that connects the old query plan 104 with the new query plan 106 can be generated and instantiated. Migration of state information from the old query plan 104 to the new query plan 106 can be triggered asynchronously on an operator-by-operator basis with respect to operators 204-206 in the new query plan 106. Relatively shortly thereafter, the new query plan 106 can become self-sufficient (that is, can output a correct data stream). Thereafter, execution of the old query plan 104 can be stopped if desired. This process can be repeated for the lifetime of the continuous query.

Referring now to FIG. 3, an exemplary continuous query plan 300 is illustrated. In this exemplary continuous query plan 300, a first join operator 302 is configured to perform a join operation on events received from an input stream A and an input stream B. The join operator 302 may have a particular predicate corresponding thereto, and the join operator 302 can concatenate events from the different input streams A and B so long as the windows of the events overlap and the predicate is satisfied. The exemplary continuous query plan 300 also comprises a second join operator 304 that acts to join the output from the first join operator 302 with an input stream C. Thus, the output of the join operator 304 is the appropriate concatenation of events in stream AB and events in stream C. Additional details pertaining to join operators will be provided below. From viewing the exemplary continuous query plan 300, it can be understood that the output of the exemplary continuous query plan 300 is the join of input streams A, B and C.

Turning now to FIG. 4, another exemplary continuous query plan 400 is illustrated. This continuous query plan 400 is logically identical to the continuous query plan 300 but is structurally different. Specifically, the continuous query plan 400 comprises a first join operator 402 that acts to join events from input streams A and C. Accordingly, the output of the join operator 402 is output stream AC, which is provided to another join operator 404. The join operator 404 also receives inputs from input stream B and accordingly the output of the join operator 404 (and thus the output of the continuous query plan 400) is the join of A, C and B, which is logically equivalent to the join of A, B and C as discussed with respect to FIG. 3. It can be ascertained from reviewing the continuous query plans 300 and 400 that migration is nontrivial. That is, the state of the join operator 302 that joins input streams A and B cannot simply be transmitted to the join operator 402 that joins input streams A and C, since these join operators perform joins on different input streams.

Figure 5:
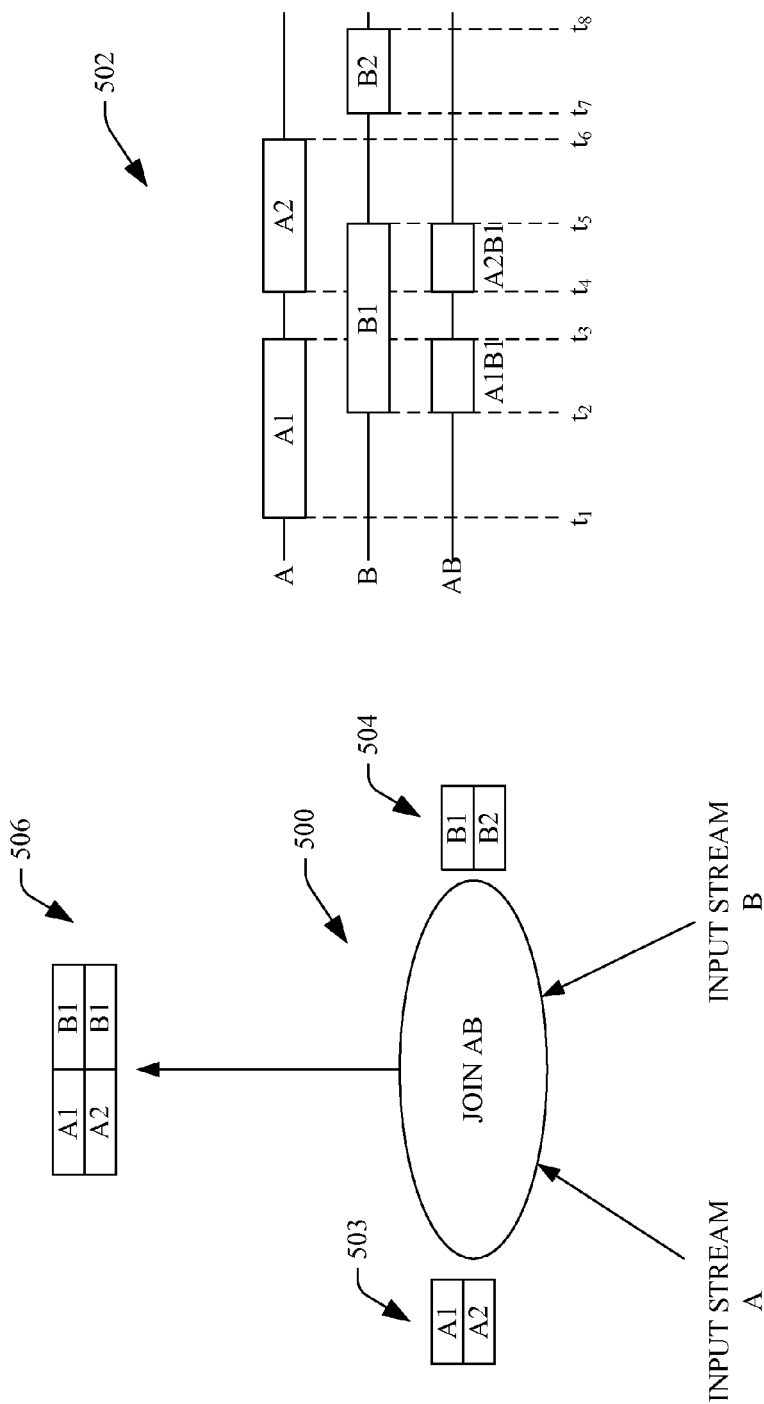
FIG. 5 depicts an exemplary operator that can be included in a continuous query plan and state information corresponding to such operator.

Referring now to FIG. 5, an exemplary depiction of a join operator 500 is illustrated along with a timing diagram 502 of events provided to the join operator. The join operator 500, in this example, is configured to receive events from an input stream A and an input stream B. As can be ascertained, the join operator 500 comprises a first table 503 corresponding to the input stream A and a second table 504 corresponding to the input stream B. These tables 503 and 504 corresponding to joins can also be referred to herein as synopses.

Referring to the timing diagram 502, it can be ascertained that an event A1 has a first timestamp of time $t_1$ and a window of $t_1$-$t_3$. Accordingly, upon receipt of the event A1, the join operator 500 can cause the event A1 to be retained in the synopsis 503. An event B1 can also be received at the join operator 500 on input stream B, wherein the event B1 has a beginning timestamp of $t_2$ (which is after $t_1$ and before $t_3$) and an end timestamp of $t_5$ (which is after $t_3$). Accordingly, the event B1 can be placed in the synopsis 504 that corresponds to the input stream B. Since, as shown in the timing diagram 502, it can be ascertained that the event A1 and the event B1 have overlapping windows, the join operator 500 can output a concatenation of A1 and B1 in an output data stream 506 (assuming that any required predicate has been met). In this example, as shown on line AB in the timing diagram 502, the predicate has been met and the join operator 500 can output the join of A1 and B1 in the output data stream 506.

Referring again to the timing diagram 502, at time $t_3$, the window of the event A1 completes, and thus the window of the output event A1B1 is between time $t_2$ and time $t_3$. At time $t_4$, an event A2 is received on input stream A, wherein the event A2 has a beginning timestamp at $t_4$ and an end timestamp at $t_6$. Accordingly, the window of the event A2 overlaps the window of the event B1. Again, assuming that a required predicate has been met, the join operator can output the event A2B1 in the output stream 506, wherein the event A2B1 has a window of time $t_4$ to time $t_5$. Additionally, upon receipt of the event A2 in the input stream A, the synopsis 503 can be updated to include the event A2. At time $t_7$ an event B2 is received on the input stream B, and accordingly the event B2 is added to the synopsis 504. The window of B2 is shown to not overlap with any events received on the input stream A, and thus the join operator 500 does not include an output event that includes B2.

While the events have been shown and described in the timing diagram 502 as arriving at particular times in the event stream A and event stream B, it is to be understood that this description is only for the sake of illustration. In real-world implementations, events may be received out of order, and one input stream may lag behind another input stream with respect to time. Accordingly, events are retained in the synopses 503 and 504 until they can safely be removed (when there is some guarantee that an event with an overlapping window will not arrive on the other input stream).

As mentioned previously, CTIs (which also may be referred to as punctuations or heartbeats) can be used to limit disorder of events in data streams. Further, CTIs can be employed to limit an amount of state information that is to be retained at stateful operators. Thus, to reduce events maintained in the synopses 503 and 504, DSMSs support recognition of particular time markers. A CTI on an input stream can guarantee that an operator will not receive an event on the input stream with a beginning timestamp prior to the timestamp in the CTI. Therefore, a CTI can inform a continuous query that any stateful operator that has processed events that arrived preceding the CTI can release the event under specific conditions. In the example depicted in FIG. 5, a CTI has not been received on either input stream A or B. However, it can be ascertained that if a CTI was received on input stream B subsequent to time $t_6$ but prior to time $t_7$, then events A1 and A2 can be removed from the synopsis 503.

Still more detail is now provided regarding the join operator 500. Such join operator 500 can be referred to as a symmetric temporal hash join, wherein joins of this type are extensively used in continuous queries when quicker response times are desired or when the inputs are streaming from a wide-area network. A symmetric temporal hash join is fully pipelined. That is, when an event appears at either the input stream A or the input stream B, it is incrementally added to the corresponding synopsis 503 or 504 and probed against the opposite synopsis 503 or 504.

States of the join operator 500 are limited by the progress and the disorderliness of input streams. Specifically, if a CTI is included in an input stream B of the join operator 500, an event that preceded the CTI on the other input stream (input stream A) can be released if, and only if, the timestamp of the CTI is greater than the end time of the received event. From the preceding example, if the timestamp of the CTI is after time $t_6$ but before $t_7$, the end times of events A1 and A2 are all before the timestamp corresponding to the CTI. Thus, in this example, events A1 and A2 can be removed from the synopsis 503.

Figure 6:
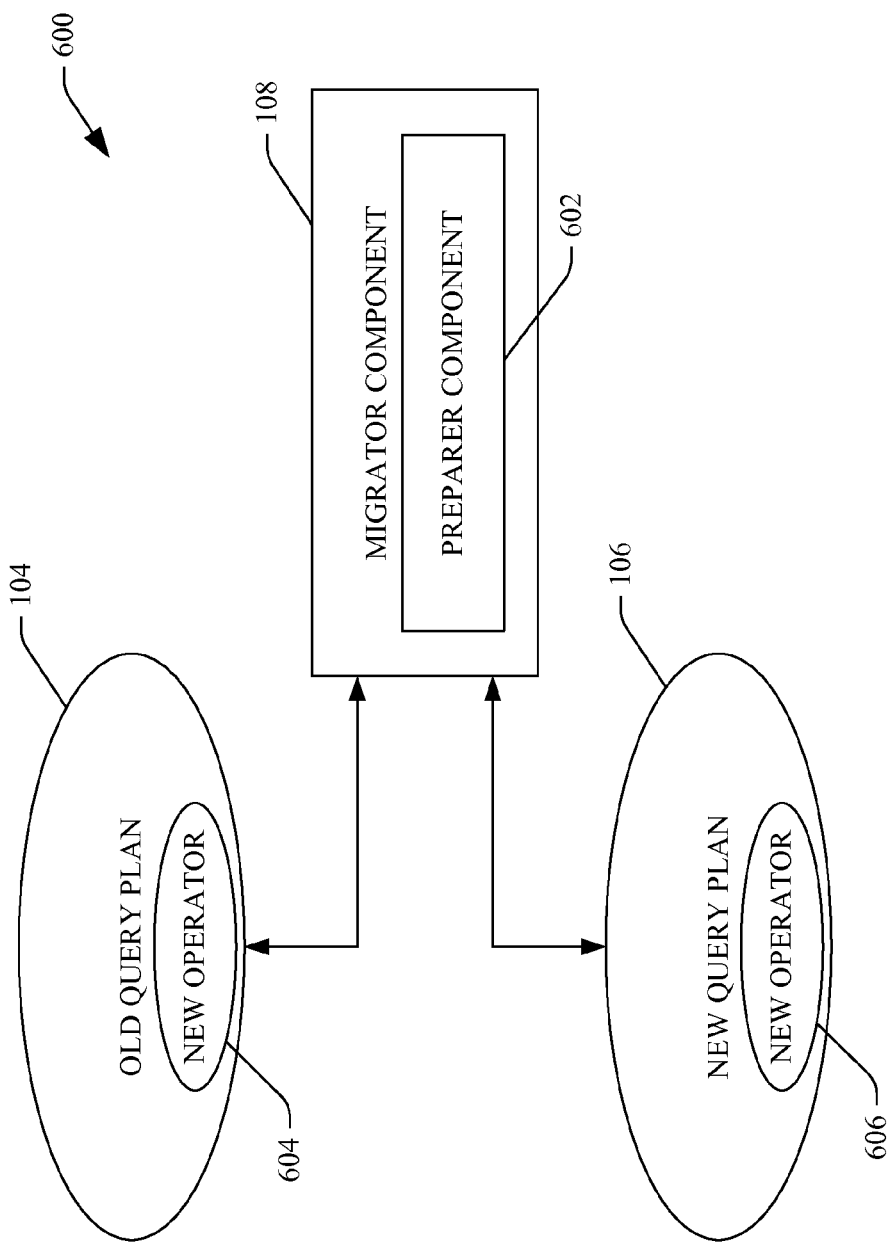
FIG. 6 is a functional block diagram of an exemplary system that facilitates preparing a first continuous query plan and a second continuous query plan for migration.

Turning now to FIG. 6, an exemplary system 600 that facilitates preparing the old query plan 104 and the new query plan 106 for migration of state information of stateful operators in the old query plan 104 to the new query plan 106 is illustrated. The system 600 comprises the migrator component 108 that receives the old query plan 104 and the new query plan 106. The migrator component 108 comprises a preparer component 602 that prepares the old query plan 104 and the new query plan 106 for state migration. In connection with preparing the old query plan 104 and the new query plan 106 for state migration, the preparer component 602 can cause at least one new operator 604 to be added to the old query plan and at least one other new operator 606 to be added to the new query plan. For instance, the new operator 604 added to the old query plan 104 may be a multicast operator while the new operator 606 added to the new query plan 106 may be a union operator.

With more specificity with respect to the old query plan 104, the preparer component 602 can perform the following actions to prepare the old query plan 104 to be ready for migrating state information to the new query plan 106. A multicast operator can be added above each import operator in the old query plan 104. The import operator is an operator that feeds data from an input adapter to the other operators in a query plan. Additionally, a multicast operator can be added immediately beneath each stateful operator in the old query plan 104. For multi-input stateful operators such as joins, a multicast operator can be added beneath each input of such operator. Furthermore, at least one additional output stream can be added for stateful operators, wherein a number of output streams added to a stateful operator can equal the number of input streams to such stateful operator. The additional output stream(s) are used to transfer state of a stateful operator. In the case of the join operator described in FIG. 5, two output streams can be added: one for the synopsis 503 corresponding to input stream A and one for the synopsis 504 corresponding to input stream B. The above discussion assumes that the input adapter is not migrated. That is, the new query plan 106 reuses future inputs from the same input adapters as the old query plan 104. The extension to the case where the entire old query plan 104 is migrated, including adapters, is straightforward.

As indicated above, the preparer component 602 can additionally prepare the new query plan 106 for receiving migrated state information from the old query plan 104. When the new query plan 106 is received, the new query plan 106 can be instantiated with disabled imports so that the new query plan 106 does not connect to an input adapter and begin processing events. The preparer component 602 can make the following alterations to the new query plan 106: a union operator can be added immediately above the import adapter and a union operator can be added immediately below each stateful operator input in the new query plan 106. Each union operator added to the new query plan 106 can receive two inputs: a first input that will connect to an output of the old query plan 104 by way of a corresponding multicast operator and another input that receives original input from within the old query plan 104.

A union operator added to the new query plan 106 by the preparer component 602 can have a special scheduling policy to enforce priority across inputs of the union operator. Specifically, inputs that are fed from within the new query plan 106 have lower priority than inputs received from a transformation plan to migrate state information from the old query plan 104. Accordingly, a union operator will read input streams from a lower priority stream only after it sees an end of stream notification from a higher priority stream. This prioritization across the inputs of a union operator ensures that if a retraction or expansion for an event is received after insertion of the event into the event stream, the new query plan 106 does not see this retraction or expansion before processing the corresponding original event.

Figure 7:
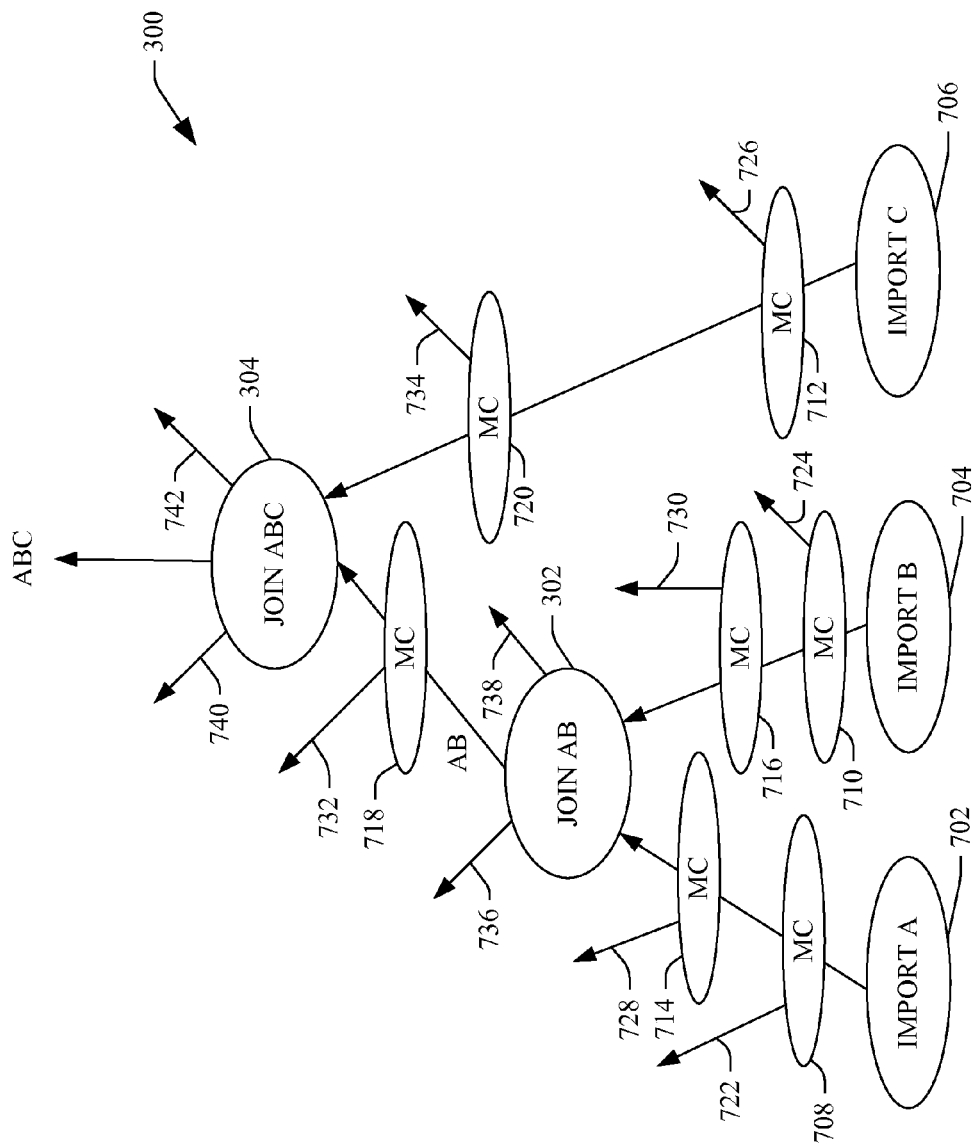
FIG. 7 is an exemplary continuous query plan that has been prepared for migration of state information therefrom.

Referring now to FIG. 7, an exemplary depiction of the old query plan 300 shown in FIG. 3 subsequent to the preparer component 602 preparing the old query plan 300 for migration is illustrated. The old query plan 300 comprises the join operators 302 and 304 which were discussed above. Additionally, import operators 702, 704 and 706 are included in the old query plan 300. As described above, multicast operators 708, 710 and 712 are placed directly above the import operators 702, 704 and 706 respectively. Additionally, multicast operators 714 and 716 are placed immediately below each input to the stateful join operator 302. Moreover, multicast operators 718 and 720 are placed immediately below the inputs to the join operator 304, respectively.

Each multicast operator 708-720 has two outputs. One output causes data to be passed through the old query plan 300 as if the multicast operators 708-720 were not included in the old query plan 300. The other outputs from the multicast operators 708-720 are directed to stubs (temporarily not received by another operator), and can be mapped to the new query plan 400 by way of a suitable transformation plan when migration is initiated. Thus, for instance, the multicast operator has an output 722 corresponding thereto that will be mapped to the new query plan 400 by way of a transformation plan during migration. Similarly, multicast operators 710-720 have outputs 722-734. These outputs can be directed to the new query plan 400 by way of the transformation plan during migration.

It can be noted that, in an exemplary embodiment, after the new query plan 106 is instantiated and connected to the old query plan 104 by way of the transformation plan 202, events do not automatically begin flowing from the old query plan 104 to the new query plan 106. The multicast operators shown in this figure need not forward every event to the new query plan 106. Instead, a multicast operator can follow a protocol described below in order to determine when the connection to the transformation plan 202 will be enabled or disabled for forwarding events.

Additionally, each of the stateful join operators 302 and 304 can have outputs corresponding to synopses maintained by the join operators 304 and 304. Thus, the join operator 302 can have a first output 736 corresponding to the synopsis for input data stream A and a second output 738 corresponding to the synopsis for the input stream B. Similarly, the join operator 304 can have an output 740 corresponding to the synopsis for input stream AB and an output 742 corresponding to the synopsis for input stream C.

Figure 8:
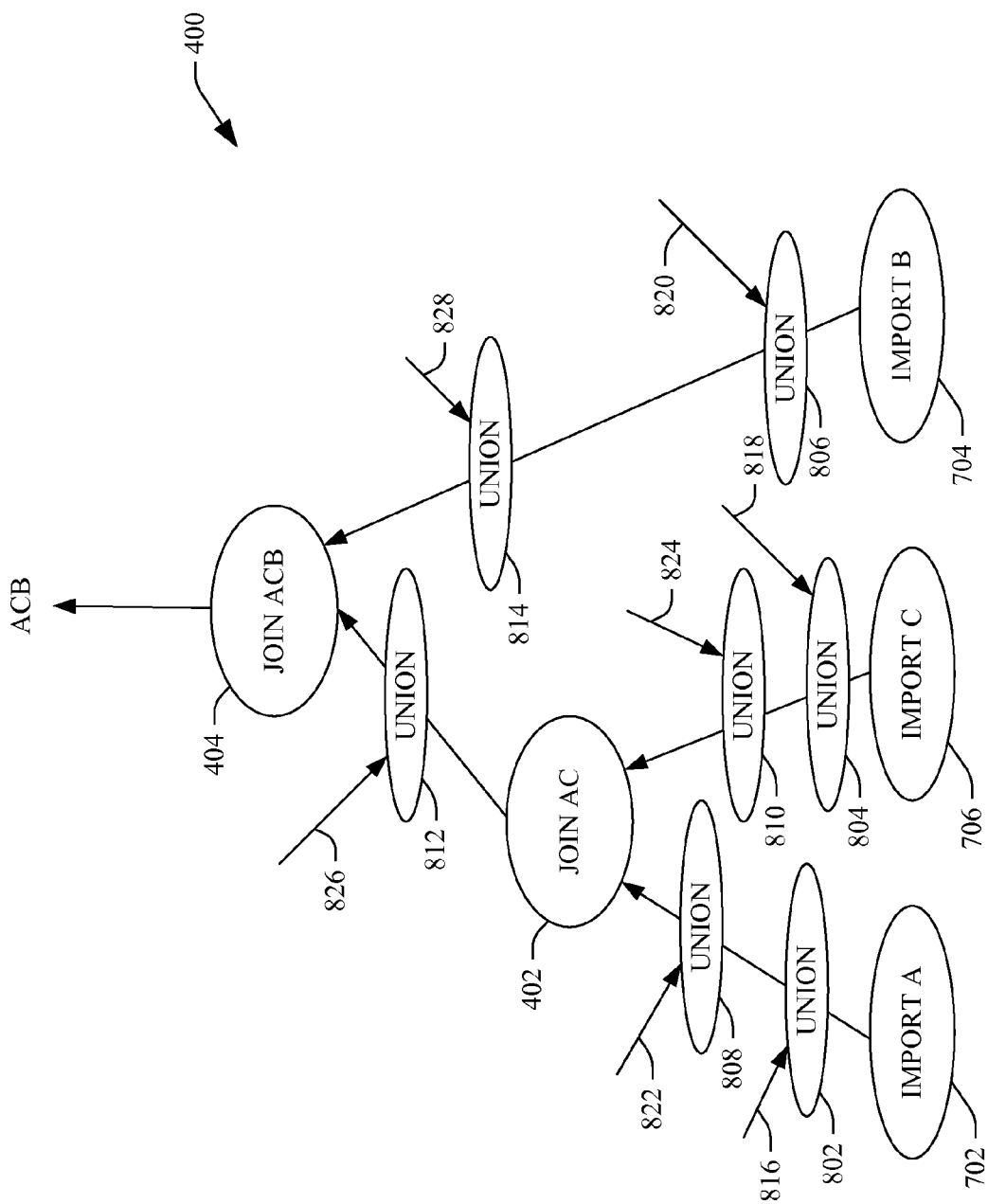
FIG. 8 is another exemplary continuous query plan that has been prepared for migration of state information thereto.

With reference to FIG. 8, an exemplary depiction of the new query plan 400 subsequent to the preparer component 602 preparing the new query plan 400 for migration is illustrated. The new query plan comprises the join operators 402 and 404, respectively. As described previously, the new query plan 400 also includes import operators 702, 704 and 706. The preparer component 602 can place union operators 802, 804 and 806 immediately above the import operators 702, 704 and 706. Additionally, union operators are placed below each stateful operator in the new query plan 400. Thus, union operators 808 and 810 are placed on the input streams, respectively, to the join operator 402, and the union operators 812 and 814 are placed below the inputs, respectively, to the join operator 404. Each of the union operators 802-814 can have inputs 816-828 corresponding thereto that receive data from the old query plan 300 by way of a transformation plan.

Migration of state information from the old query plan 300 to the new query plan 400 subsequent to being prepared for migration by the preparer component 602 will now be described. The procedure of migration of state information from the old query plan 300 to the new query plan 400 can be triggered from the old query plan 300. Triggering from the old query plan 300 can be undertaken through the utilization of a special event, which can be referred to as migration start marker (MSM) that is placed at the input of one of the operators in the old query plan 300. The MSM indicates the beginning of migration for a particular operator in the old query plan 300. A migration end marker (MEM) denotes the end of migration for a particular stream of data (e.g., if desired, the old query plan need not receive the stream of data subsequent to the operator receiving the MEM). Each of the MSM and MEM can include a set of control parameters that represents customized directions for different operator types based at least in part upon possible operator states. Migration initiates upon an MSM being inserted into an input stream of one of the multicast operators inserted into the old query plan 300 by the preparer component 602. Insertion of an MSM can be performed by a separate thread or at an input adapter, where it travels like a normal event to a multicast. Once migration is triggered at the old query plan 300, data begins flowing from the old query plan 300 toward the transformation plan, which will be discussed below. Each multicast operator can be asynchronously triggered for migration. The protocol for asynchronously migrating state information from stateful operators in the old query plan 300 to the new query plan 400 is provided below.

When a multicast beneath a stateful operator in the old query plan receives a MSM, the multicast enables the connection to a transformation plan (if it has not previously already received the MEM marker from its child). This transformation plan is instantiated at the time of creation of the new query plan and thus, for purposes of explanation, at this point in time it can be assumed that the transformation plan exists. Generation of the transformation plan is described below. Once a connection is opened to the transformation plan, every subsequently received event from the multicast operator is sent to the old query plan as well as the transformation plan. Additionally, the multicast operator then sends a MSM to the stateful operator above the multicast operator to trigger migration of state information from such operator.

The multicast receives a MEM from its child operator once the child operator completes migration. Upon receiving a MEM marker, the multicast operator disables the connection to the transformation plan so long as the MSM had been seen by the multicast operator previously.

For a multicast operator above an import operator, when such multicast operator receives a MSM, the multicast operator will forward subsequently received events to the transformation plan. While different from a multicast operator below a stateful operator, such multicast operator above an import operator will send an MEM to its original parent to ensure that its parent operators can end their migration procedure. The multicast also serves as a control valve for the old query plan. If the DSMS determines that the old query plan should be shut down, the multicast will stop feeding its original parent operator events.

As described above, outputs are added to each stateful operator in the old query plan, wherein the number of outputs for a particular operator is equal to a number of inputs provided to that operator. The protocols described above for having the multicast operator begin transmitting data and connecting to the transformation plan have accomplished forwarding events from streams (or queues) in the old query plan 300 to the transformation plan. The events maintained, however, in the states of a stateful operator are also needed for the new query plan 400 to output correct data, and thus should be copied to the transformation plan as well. For the purposes of explanation, the migration protocol for a multi-input join operator is discussed. The migration protocol for a single-input stateful operator can be straightforwardly derived from the protocol described herein.

When a multi-input stateful operator has received an MSM from both multicast operators beneath the multi-input stateful operator, an internal state migration can be initialized at the multi-input stateful operator, wherein internal migration comprises copying and sending out its synopses via the appropriate output streams. After transmitting all events in the synopses of the multi-input stateful operator, such operator transmits a MEM to its original parent operator. This procedure waits until both inputs of the multi-input join operator have received the MSM and the forwarding of multiple synopses from the stateful operator is conducted at a same point in time. However, time can be saved by asynchronously transmitting state information from such a stateful operator.

Pursuant to an example, a stateful operator can first receive an MSM on one of its inputs, which can be denoted as input i (i=0 or 1). The synopses for (1−i) can be immediately sent to its corresponding output stream (no events are processed during such sending). Thereafter, every subsequent event received on input (1−i) is forwarded to the output corresponding to the synopsis in addition to performing normal operation. Thereafter, when the stateful operator later receives the MSM on its other input, namely input (1−i), the current internal synopsis for input stream i can be transmitted to the output corresponding thereto. Once migrations on both sides are completed, the operator can send a MEM to the original parent in the old query plan.

It can be noted that when an MSM is received on input i, new events coming from stream (1−i) cannot be written into the synopsis if the synopsis is being read due to state forwarding. Thus, those events can be temporarily buffered in a secondary synopsis. They can also be joined with events in the synopsis associated with stream i to produce join results. Meanwhile, new events coming from the stream i can processed as before since they only need to perform read-only operations on the synopsis associated with stream (1−i).

Furthermore, if stateful event conversion is performed synchronously (in the same thread), the stateful operator can instead choose to first write the MEM marker to its output stream in its current plan since the stateful operator is guaranteed to complete migration of state before processing any other event in this operator. This alternative can allow the downstream subplan to begin migration earlier if a bottom-up migration order is followed. Of course, it is to be understood that a top-down migration approach can also be employed by injecting the migration markers from a top operator downwards.

Referring back to FIG. 2, generation of the transformation plan 202 will be explained. As mentioned previously, the transformation plan 202 can be compiled and instantiated at a substantially similar time that the new query plan 106 is created in the DSMS but prior to triggering of migration. If the old query plan 104 and the new query plan 106 are both structurally and logically equivalent, then the migration and transformation is relatively straightforward. Essentially, each multicast operator added in the old query plan 104 connects to its corresponding union operator added in the new query plan 106. The synopses output by each join operator in the old query plan and corresponding multicast operator(s) (the one (s) beneath the join operator) are fed to a union, which gives priority to the input from the join operator.

If, however, the old query plan 104 and the new query plan 106 are structurally different but logically equivalent, other mechanisms can be employed when generating the transformation plan 202. First, data structures can be introduced and utilized when matching state information between operators in the old query plan 104 and the new query plan 106. For each synopsis in a stateful operator such as the join operator, as well as for each multicast operator and union operator placed in the old query plan 104 and the new query plan 106, respectively, for migration, a signature can be maintained to efficiently look up matched states. A signature comprises the schema of the stream data at the point of the signature, along with additional information that is used to accomplish correct state matching and plan migration. Here, schema refers to the set of columns in the corresponding event stream. Each signature belonging to the old query plan 104 can be retained in a hash table where the hash key is the schema and value is the signature.

The additional information associated with each signature depends on the specific transformations that have been applied in order to derive the new query plan from the old query plan. For example, in a case where a join plan is migrated with selection and projection operators, where the selection and projection operators may be pushed (moved) up or down in the new query plan, the additional information for each signature consists of an oplist—a list of selection and projection operations that have been applied to the stream prior to reaching the current location.

A connection refers to a state-transfer strategy from an old synopsis or a multicast operator in the old query plan to a set of migration unions in the new query plan. Transferring from an old state to a new state may require additional selection and/or projection operators in order to correctly match intermediate content. For instance, referring to FIGS. 3 and 4, if one wished to move the state of AB in the old query plan 300 to the state A in the new query plan 400, then the A columns from AB may need to be projected for the sake of matching the schema.

Given the above, state matching can be considered to be the procedure of finding all connections for old states in the old query plan. In an example, a particular state-matching algorithm can be employed for the case of migrating an old query plan with join operators, to a new query plan with the join operators reordered. The intuition behind state matching algorithm for reordered joins is as follows: once a subset of columns in an old state signature (or schema) is matched to a new state signature (or schema), the matched columns in the old state do not need to be matched again to any other new state. In other words, a synopsis with a particular signature needs to only be sent to the minimum set of destination synopses that "cover" the signature, e.g., every column in the old signature is covered by some new signature that is connected to the old signature. One strategy for achieving the above is discussed below. Given an old signature, a new signature that maximally matches (has the most number of columns in common) with the old signature is found. Thereafter, the corresponding matched columns are "removed" from the old signature and the old signature is recomputed. Subsequently, the next maximal matching new signature for the recomputed old signature is found. This process is repeated until every column in the old signature is matched to some new signature. As a concrete example, in FIG. 3 the AB synopsis needs to be sent to A and B since A and B together cover AB completely. A more complicated example can be as follows. An old query plan $(((A\bowtie B)\bowtie C)\bowtie D)$ may be desirably migrated to the new query plan $(((B\bowtie A)\bowtie D)\bowtie C)$. In this case, a synopsis with signature ABC in the old query plan need only be migrated to the synopsis in the new query plan with signatures BA and C. It need not be migrated to either the A or B synopsis, since the BA and C signatures together completely cover ABC.

In a case where selections and projections are being moved (pushed up or down) in the new query plan, this signatures discussed above can be employed to construct the correct transformation plan. Specifically, if a selection or projection operator O appears in the oplist of a synopsis in the new plan, but does not appear in the corresponding oplist in the old plan, operation O can be performed as part of the transformation plan when migrating state from the old plan to the new plan. This ensures that the corresponding operation O is applied exactly once on every stream event. On the other hand, if operation O appears in the oplist of the old plan but not in the oplist of the new plan, there are two alternatives. First, if the operation O is invertible (e.g., if O is a projection operator that sets A=A+5, then the inverse projection operation would set A=A−5), the inverse of O can be placed as part of the transformation plan between the old plan and new plan. If operation O is not invertible, a field in the event can be added that indicates that operation O has been performed, and operation O can be modified in the new plan to perform the operation only if the field is not set, thus ensuring that operation O is applied exactly once on each event. It is to be understood that the above scenarios are illustrative in nature. Other techniques can also be utilized to generate transformation plans for other query plan modifications.

Discussed above, the migration solution allows migration operators to be triggered for migration in any order, top down, bottom up, simultaneously or in some arbitrary order. Some tradeoffs may exist, however, between such approaches. First a top down approach enables a new query plan to start producing tuples early and the migration can be performed slowly in a staggered manner. Bottom up has the advantage that it simplifies duplicate eliminations in the new query plan. An arbitrary order can be determined by comprehensively considering the size of synopsis with workload of operators and so on. In a worst-case scenario, the new query plan will become self-sufficient after completing the migration of every operator in the old query plan. In any event, the techniques described herein work generally with data streams with arbitrarily disordered events (bounded by CTIs), and further support event revisions (retractions and expansions).

It is also desirable to ensure that no duplicate tuples are being generated during migration. This precaution is relevant only if moving from an old query plan to a new query plan and both the intermediate (joined) synopsis and base stream synopsis are migrated. Many DSMSs store joined results as new events. For example if one A tuples joins with five B tuples there would be five AB tuples in the AB synopsis. Thus, when AB is migrated to A in the new query plan, the result is 5 A tuples with different windows (lifetimes).

An algorithm can be utilized to eliminate potential duplicates as follows. In the new query plan, when a duplicate A tuple is located, the window of the associated tuple is adjusted to be the union of the windows of all the A tuples with the same identifier. Finally, if an original A tuple from a base synopsis is located, such procedure would automatically adjust the window (causing a deletion and reinsertion, if necessary) to the correct value. In case of a bottom-up migration approach, the event from a base synopsis table can first be inserted, thus not requiring any subsequent event deletion and reinsertion. If the original event lifetimes are known, the transformation plan can reconstruct the original event before forwarding to the new query plan. In this case event deletion, reinsertion and/or expansion is not needed, just duplicate elimination. Even duplicate elimination can be avoided if each operator is made aware of exactly what tuples the other operators are going to migrate, thus avoiding sending any duplicate events. In practice it can be noted that duplicate elimination would add minimal overhead and is required only during migration.

Further, if only the base table synopsis and not the intermediate synopsis are migrated, duplicate elimination is not needed. To meet different quality-of-service requirements, two kinds of state matching and moving strategies can be supported. Moving all the synopses (what has been described above) or moving only the base stream (no joined intermediate results). For illustration, continuing with the exemplary plan shown in FIGS. 3 and 4, when the plan $((A \bowtie B) \bowtie C)$ is migrated to the plan $((A \bowtie C) \bowtie B)$ there are two options: 1) send all the synopses to the new query plan based on what has been described above; 2) send only the base tables (A, B and C) to the new query plan. While a second approach is immune from the duplicate issue, it will take longer for the new query plan to become self-sufficient since the A tuples inside the AB synopsis that may not be present in the A synopsis do not get transferred to the new query plan.

Figure 9:
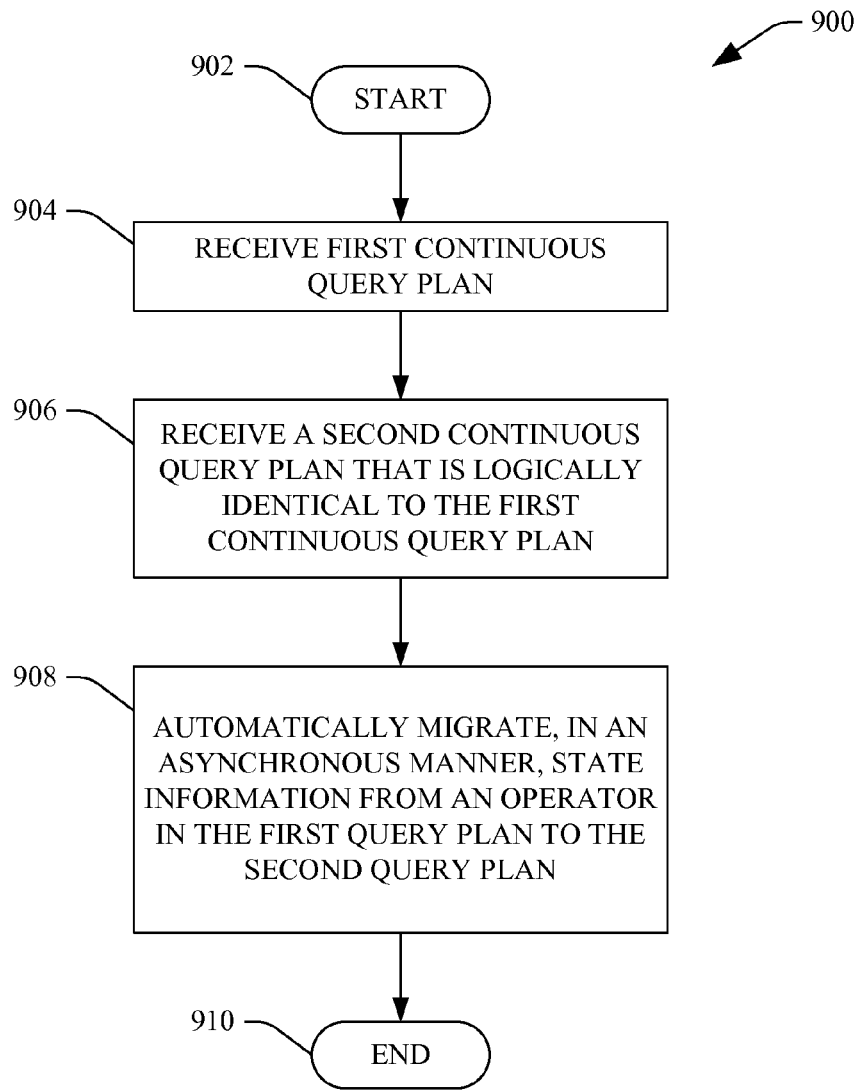
FIG. 9 is a flow diagram that illustrates an exemplary methodology for automatically migrating, in an asynchronous manner, state information from an operator in a first continuous query plan to a second continuous query plan.
Figure 10:
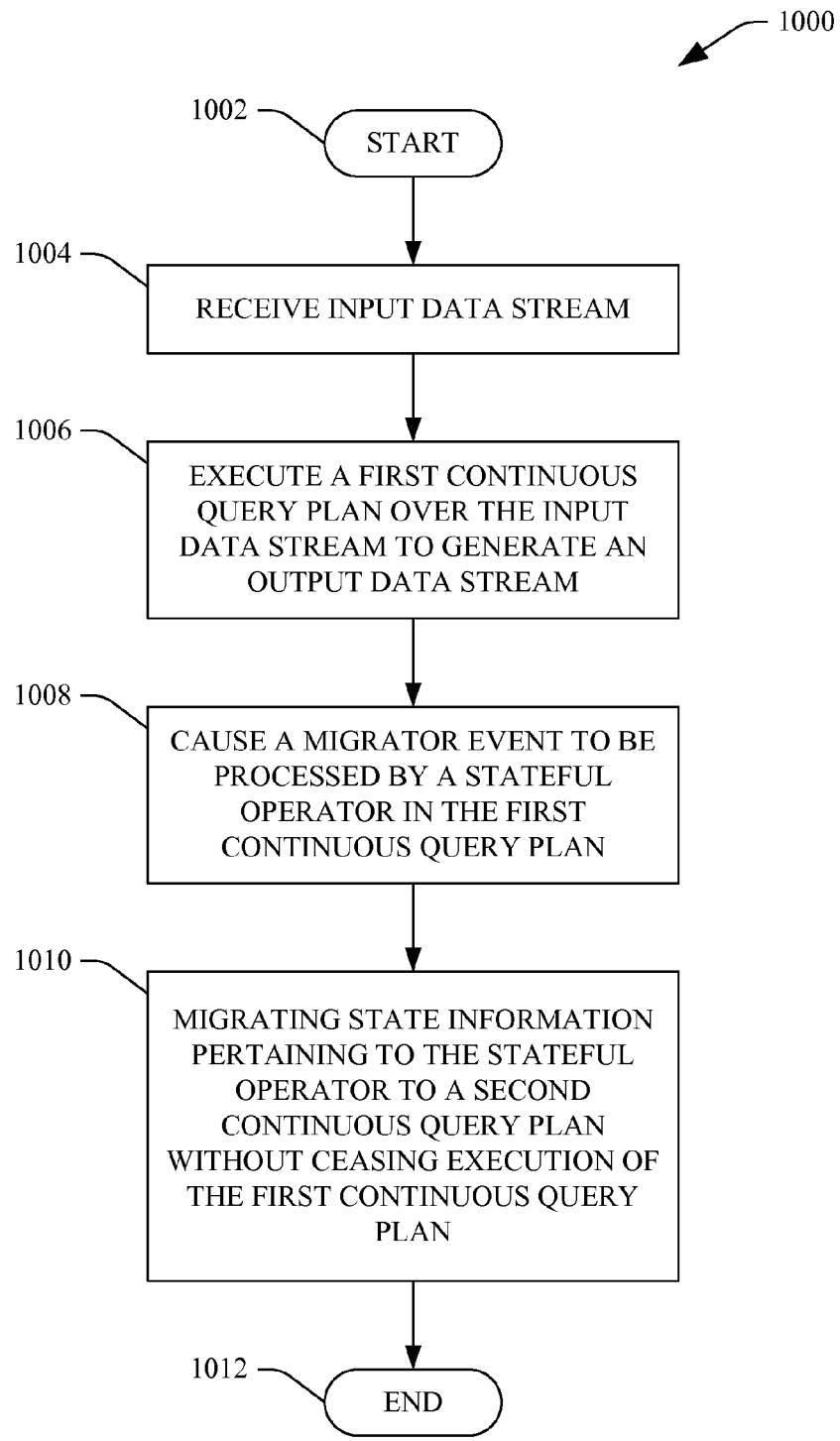
FIG. 10 is a flow diagram that illustrates an exemplary methodology for asynchronously migrating state information pertaining an operator in a first continuous query plan to a second continuous query plan without ceasing execution of the first continuous query plan.

With reference now to FIGS. 9-10, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 9, a methodology 900 that facilitates asynchronously migrating state information from a first query plan to a logically equivalent second query plan is illustrated. The methodology 900 begins at 902, and at 904 a first continuous query plan is received. The first continuous query plan as described above can be a directed acyclic graph, wherein the nodes of the graph are operators and edges of the graph are streams or queues for the operator. Thus, the first continuous query plan comprises a first plurality of operators that are configured to continuously perform processing operations on temporal data received by such operators.

At 906, a second continuous query plan is received, wherein the second continuous query plan is logically equivalent to the first continuous query plan. The second continuous query plan comprises a second plurality of operators that are configured to perform continuous processing operations on the temporal data.

At 908, state information from an operator in the first query plan is automatically migrated in an asynchronous manner to the second continuous query plan. Thus, the first continuous query plan can be continually executed over temporal data while the second continuous query plan is relatively quickly brought up to speed with state information to begin executing over the temporal input streams of data. The methodology 900 completes at 910.

Referring now to FIG. 10 another exemplary methodology 1000 for migrating state information from a stateful operator in a first continuous query plan to a second continuous query plan is illustrated. The methodology 1000 starts at 1002, and at 1004 an input data stream is received, wherein the input data stream comprises a plurality of temporal events. These temporal events may be received in sequence or out of sequence.

At 1006, a first continuous query plan is executed over the input data stream to generate an output data stream. The first continuous query plan can comprise a plurality of operators that perform operations on events in the data stream, wherein at least one operator in the plurality of operators is a stateful operator such as a join operator.

At 1008, a migrator event is caused to be processed by the stateful operator in the first query plan. At 1010, responsive to processing the migrator event, the at least one stateful operator can commence migrating state information corresponding thereto to the second continuous query plan, wherein the first continuous query plan continues to produce the output stream, wherein the at least one stateful operator commences migrating state information corresponding thereto in the second continuous query plan. The methodology 1000 completes at 1012.

Figure 11:
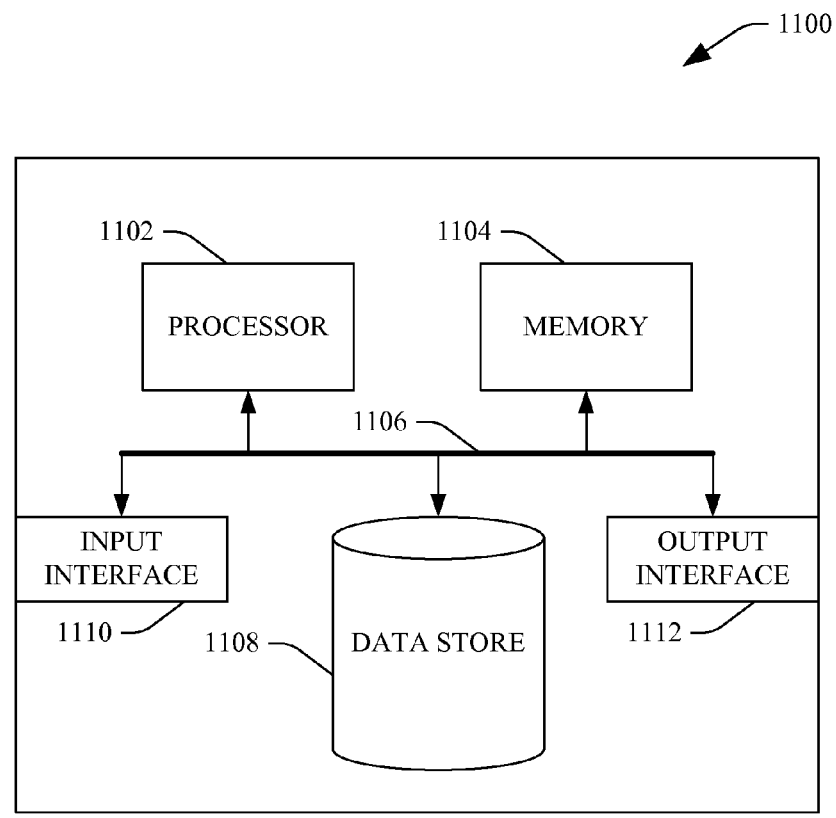
FIG. 11 is an exemplary computing system.

Now referring to FIG. 11, a high-level illustration of an exemplary computing device 1100 that can be used in accordance with the systems and methodologies disclosed herein is illustrated. For instance, the computing device 1100 may be used in a system that supports asynchronously migrating state information from an operator in a first continuous query plan to a second continuous query plan. The computing device 1100 includes at least one processor 1102 that executes instructions that are stored in a memory 1104. The memory 1104 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store synopses related to stateful operators, a continuous query plan, amongst other data.

The computing device 1100 additionally includes a data store 1108 that is accessible by the processor 1102 by way of the system bus 1106. The data store may be or include any suitable computer-readable storage, including a hard disk, memory, etc. The data store 1108 may include executable instructions, continuous query plans, queries, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
    receiving a first continuous query plan, wherein a continuous query plan is a logical representation of a query, wherein the first continuous query plan comprises a first plurality of operators that continuously perform processing operations on temporal events, at least one temporal event in the temporal events comprising a time window during which the at least one temporal event contributes to an output of the first continuous query plan, the temporal events further comprising at least one revision event, the at least one revision event modifying the time window of the at least one temporal event;
    receiving a second continuous query plan, wherein the second continuous query plan comprises a second plurality of operators that are configured to continuously perform processing operations on the temporal events, wherein the second continuous query plan is logically equivalent to the first continuous query plan; and
    using a processor to automatically migrate, in an asynchronous manner, state information of at least one operator in the first plurality of operators to the second continuous query plan.

2. The method of claim 1, wherein the processing operations in the first continuous query plan and the second continuous query plan comprise a join operation.

3. The method of claim 1, wherein the first continuous query plan and the second continuous query plan are structurally equivalent continuous query plans.

4. The method of claim 1, wherein the first continuous query plan and the second continuous query plan are structurally non-identical continuous query plans.

5. The method of claim 1, wherein automatically migrating in the asynchronous manner comprises migrating states of operators in the first continuous query plan to the second continuous query plan incrementally.

6. The method of claim 1, wherein the first continuous query plan is executed over the temporal events without interruption while the state information is migrated from the at least one operator in the first plurality of operators to the second continuous query plan.

7. The method of claim 1, wherein the first continuous query plan comprises a stateful operator, and further comprising preparing the first continuous query plan for migrating state information, wherein preparing the first continuous query plan for migrating state information comprises inserting a multicast operator immediately beneath the stateful operator in the first continuous query plan.

8. The method of claim 7, wherein preparing the first continuous query plan for migrating the state information further comprises adding at least one additional output stream to the stateful operator.

9. The method of claim 1, wherein the second continuous query plan comprises a stateful operator, and further comprising preparing the second continuous query for receiving state information from the at least one operator in the first continuous query plan, wherein preparing the second continuous query for receiving the state information comprises inserting a union operator immediately beneath the stateful operator in the second continuous query plan, wherein the union operator is configured to receive state information pertaining to the at least one operator in the first continuous query plan.

10. The method of claim 1, wherein the act of automatically migrating comprises transferring state information of the at least one operator in the first continuous query plan to the second continuous query plan by way of a transformation plan.

11. The method of claim 1, further comprising, subsequent to the automatic migrating, terminating the first continuous query plan while continuing execution of the second continuous query plan.

12. The method of claim 1, further comprising, subsequent to the automatic migrating, simultaneously executing both the first continuous query plan and the second continuous query plan.

13. The method of claim 1, wherein the first plurality of operators execute across a plurality of computing devices.

14. A system comprising a plurality of components that are executable by a processor, the components comprising:
    a receiver component that receives a first continuous query plan and a second continuous query plan, wherein the first continuous query plan and the second continuous query plan are configured to execute continuously over a data stream that comprises temporal events, wherein outputs of the first continuous query plan and the second continuous query plan are logically equivalent, and wherein the first continuous query plan comprises a first plurality of operators that perform processing operations on events in the data stream and the second continuous query plan comprises a second plurality of operators that are configured to perform processing operations on events in the data stream; and
    a migrator component that causes state information corresponding to the plurality of operators in the first continuous query plan to be asynchronously migrated to the second continuous query plan.

15. The system of claim 14, wherein the first continuous query plan and the second continuous query plan are structurally equivalent.

16. The system of claim 14, wherein the migrator component causes an event to be received by an operator in the first continuous query plan, wherein the operator initiates migration of state information corresponding to the operator to the second continuous query plan responsive to receipt of the event.

17. The system of claim 14, wherein the migrator component causes the state information corresponding to the plurality of operators in the first continuous query plan to be asynchronously migrated to the second continuous query plan by way of a transformation plan, wherein the transformation plan comprises a set of operations that are constructed by utilizing signature information computed and associated with operators and/or synopses in the first continuous query plan and the second continuous query plan.

18. The system of claim 14, wherein the migrator component comprises a preparer component that prepares the first continuous query plan and the second continuous query plan for asynchronous migration of state information by adding a first operator to the first continuous query plan and adding a second operator to the second continuous query plan.

19. The system of claim 14, wherein at least one operator in the plurality of operators is a join operator that concatenates events from two input streams based at least in part upon windows of the events overlapping.

20. A computing device comprising a computer-readable memory, the computer-readable memory comprising instructions that, when executed by a processor, cause the processor to perform acts comprising:
  receiving an input data stream, wherein the input data stream comprises a plurality of temporal events;
  executing a first continuous query plan over the input data stream to generate an output data stream, wherein the first continuous query plan comprises a plurality of operators that perform processing operations on events in the input data stream, wherein at least one operator in the plurality of operators is a stateful operator; and
  causing a migrator event to be received by the at least one stateful operator, wherein responsive to receiving the migrator event the at least one stateful operator commences migrating state information corresponding thereto to a second continuous query plan, wherein the first continuous query plan continues to produce the output stream while the at least one stateful operator migrates the state information corresponding thereto to the second continuous query plan.

* * * * *